Jan. 1, 1935. J. P. SPANG 1,986,076
MEAT SLITTING MACHINE
Filed Feb. 9, 1933 3 Sheets-Sheet 2
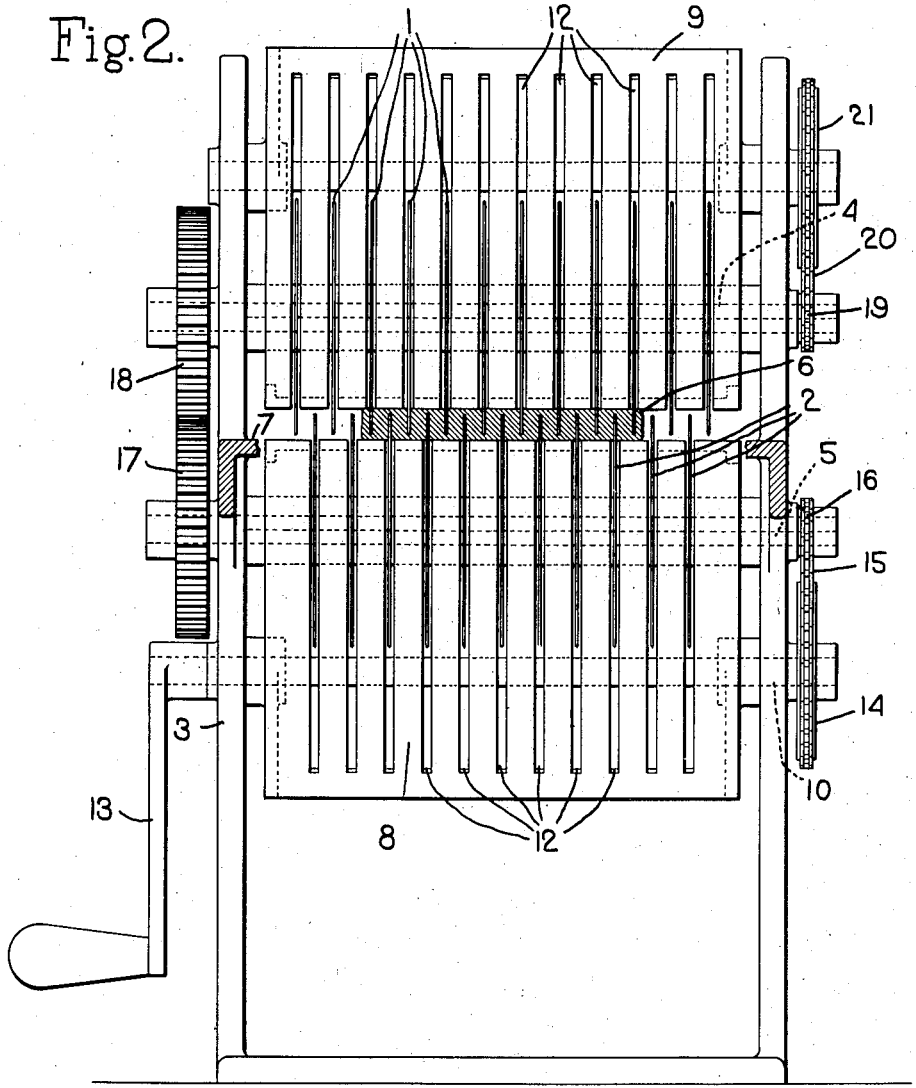
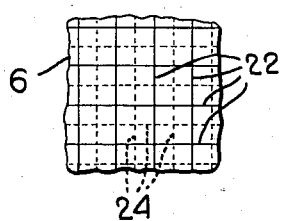
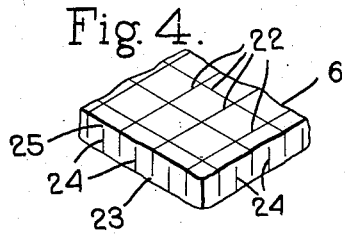
Inventor.
Joseph P. Spang
by Heard Smith & Tennant.
Attys.

Jan. 1, 1935.  J. P. SPANG  1,986,076
MEAT SLITTING MACHINE
Filed Feb. 9, 1933  3 Sheets-Sheet 3

Inventor.
Joseph P. Spang
by Heard Smith & Tennant.
Attys.

Patented Jan. 1, 1935

1,986,076

UNITED STATES PATENT OFFICE 1,986,076

MEAT-SLITTING MACHINE

Joseph P. Spang, Quincy, Mass.

Application February 9, 1933, Serial No. 655,924

10 Claims. (Cl. 17—26)

This invention relates to machines for slitting meat and it has for its general object to provide an improved machine which is constructed to cut a series of parallel slits on both sides of a slice of meat and in such a way that some at least of the slits on each side of the meat will have an overlapping relation to slits formed in the opposite side of the meat.

Some meat-slitting machines are constructed with a single set or gang of rotary slitting knives and with means to feed the meat past the knives so that the knives will cut in one face of the meat a series of parallel slits, each of which extends nearly but not quite through the slice of meat. A piece of meat which is slit with this type of meat-slitting machine will have a thin film of unslit meat on one face which serves to hold the piece of meat together. If the slice of meat should happen to be so cut that this film of meat on one face of the slice was of a tough or gristly nature some of the benefit derived from slitting the meat would be lost.

In the device embodying my present invention, however, the slice of meat is slit on both sides but in such a way that none of the slits cut clear through the meat so that there is still left a thin film of unslit meat opposite each slit. Where the slitting is done from both sides this film or the unslit portions of the meat opposite each slit have a staggered relation and are not located all in one plane as in the case where the slitting is all done on one side of the meat. As a result, if the meat contains any vein of a tough or gristly nature such vein will be cut by some of the slits and there is no possibility that the slice of meat after it has been slit will contain an uncut or unslit vein or tough portion.

While the slitting of the meat operates to cut the tough fibres or tough portions of the meat thus rendering it more tender, yet it has the further and important advantage that the slits provide additional cooking surface which results in giving the meat a better flavor when broiled.

The desirable flavor of a broiled steak results to a large extent from the flavor of the toasted outer surface of the steak. Where a steak or slice of meat is provided with a plurality of parallel slits, the walls of the slits provide an additional surface which is exposed to the heat in the broiling operation and which becomes toasted so that a steak or slice of meat which has been slit will have a much larger toasted surface and a better flavor than a steak which has not been slit. Where the slitting is done on both sides of the steak or slice of meat then such toasted surface is still further increased.

In order to give an understanding of the invention I have illustrated in the drawings some selected embodiments thereof which will now be described after which the novel features will be pointed out in the appended claims.

Fig. 2 is a section on the line 2—2, Fig. 1;

Fig. 3 is a fragmentary plan view of a steak or slice of meat which has been slit by the machine shown in Fig. 2;

Fig. 4 is a perspective view of Fig. 3;

Figure 1:
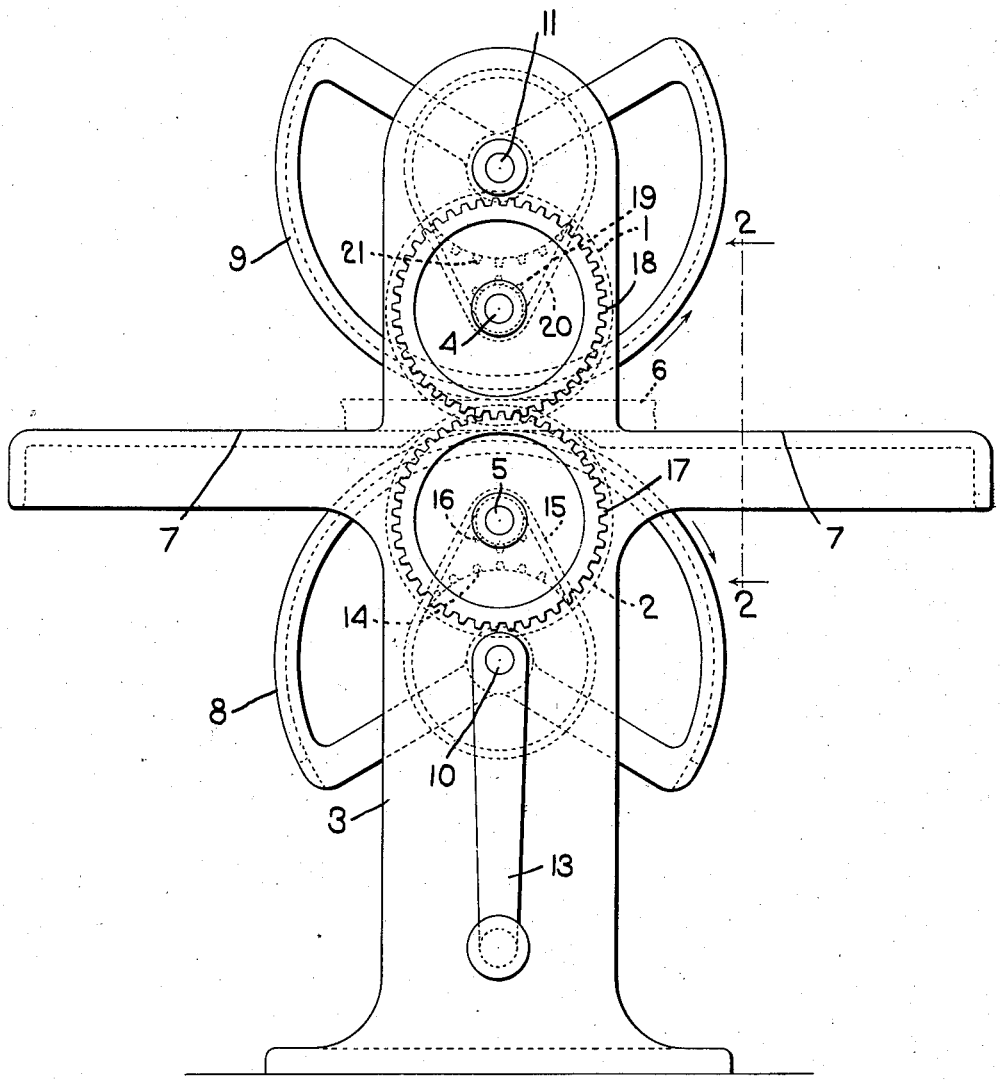
Fig. 1 is a side view of a meat-slitting machine showing one form of the invention.

The slitting machine shown in Fig. 1 is provided with two sets or gangs of rotary knives which are indicated at 1 and 2 respectively. These sets of rotary knives are rotatably mounted in a suitable framework 3, the set of knives 1 being carried by a shaft 4 and the set of knives 2 being carried by another shaft 5. Both of these shafts are suitably journalled in the frame 3.

The two sets of knives are arranged opposite each other and means are provided whereby a slice of meat 6 may be fed between the two sets of knives.

The frame 3 is shown as formed with a platform or table portion 7 which extends at each side of the knives and on which the meat rests as it is fed between the knives.

The device shown in Fig. 1 is provided with meat-feeding means for feeding the meat between the sets of knives. This meat-feeding means also functions as a stripping means to strip the meat from the knives in case said meat tends to stick to the knives.

The meat-feeding means comprises two parti-cylindrical members 8 and 9 which are mounted on shafts 10 and 11 respectively that are journalled in the frame. The cylindrical members 8 and 9 have a larger diameter than that of the slitting knives 1 and 2 and these members are so positioned on the frame that the adjacent portions of the cylindrical surfaces thereof are spaced apart a distance equal to the thickness of the slice of meat. These meat-feeding cylinders or members 8 and 9 are capable of being rotated in opposite directions and the frictional engagement thereof with the top and bottom faces of the slice of meat will serve to feed the meat forward as said members are rotated.

Said members are provided with slits 12 through which the knives project.

Any suitable means for rotating the meat-feeding members 8 and 9 and the rotary knives 1 and 2 may be employed. As herein shown the shaft 10 is provided on one end with a handle 13 by which it may be rotated. On the other end the shaft 10 is provided with a sprocket wheel 14 which is geared by a sprocket chain 15 to a small sprocket chain 16 fast on the shaft 5. With this arrangement the shaft 5 and its knives 2 will be rotated from the shaft 10 but because of the relative sizes of the sprockets 14 and 16 the knives 2 will rotate at a much greater surface speed than the meat-feeding member 8 and as a result said knives will cut the meat with a slicing or draw cut.

The knives 1 and feeding member 9 are illustrated as being driven from the shaft 5 carrying the knives 2. For this purpose said shaft 5 has at one end a gear 17 which meshes with a gear 18 fast on one end of the shaft 4. The other end of the shaft 4 is provided with a small sprocket 19 which is geared by a sprocket chain 20 to a larger sprocket 21 that is fast on the shaft 11. The sprockets 19 and 16 are of the same size as are also the sprockets 21 and 14. The gears 17 and 18 are of the same size.

With this arrangement the two gangs of knives 1 and 2 will be rotated at the same speed while the two feeding members 8 and 9 will also be rotated at the same speed, but the surface speed of the knives 1 and 2 will be much greater than that of the feeding members 8 and 9 so that both sets of knives will slit the meat with a slicing cut.

The knives 1 are shown as staggered with relation to the knives 2 as best seen in Fig. 2 so that each of the knives 1 is situated between two adjacent knives 2. Furthermore, the portions of the knives which are acting on the meat have an overlapping relation as seen in Fig. 2.

The upper set of knives 1 cut slits 22 in the upper side of the slice of meat 6, such slits being cut nearly through the meat so that there will be a thin uncut portion 23 on the under face of the slice 6 opposite each slice 22, the lower under set of knives 2 cut slits 24 in the under side of the slice 6, said slits 24 extending through the slice so that there is a thin uncut portion 25 at the top surface of the meat opposite each slit. The slits 22 and 24 thus overlap each other and the film or uncut portion of meat which holds the meat together is partially on the upper surface of the meat and partially on the lower surface thereof.

In using a slitting machine of this type it is customary to feed the meat past the knives twice and to turn the meat between the two slitting operations so that the slits which are cut in the second feeding movement of the meat will be at right angles to those made during the first feeding movement. With this double slitting of the meat each face of the slice 6 will be slit in two different directions as shown in Figs. 3 and 4 and the slits on one face of the meat have a staggered relation relative to the corresponding slits which are formed in the other face of the meat. This will give the slit meat the appearance shown in Figs. 3 and 4.

The dotted lines in Fig. 3 represent the slits formed in the underside of the meat and the full lines 22 indicate the slits formed in the upper surface of the meat. An advantage resulting from this manner of slitting the meat is that if the meat has any vein or streak which is gristly or tough such vein or streak will be slit or cut in two directions by either the upper slits 22 or the lower slits 24 or both and yet the slitting of the meat is done so that the slice will hold together even after it has been slit on both faces.

Figure 5:
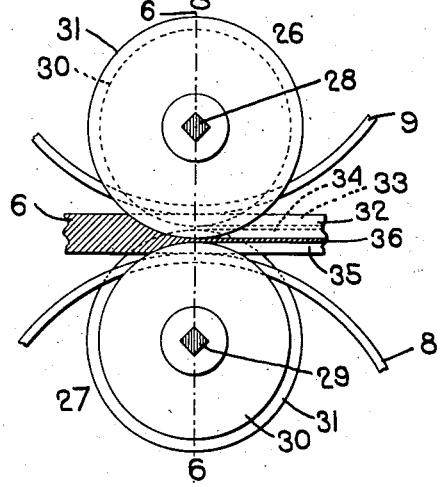
Fig. 5 is a fragmentary sectional view showing a different embodiment of the invention.
Figure 6:
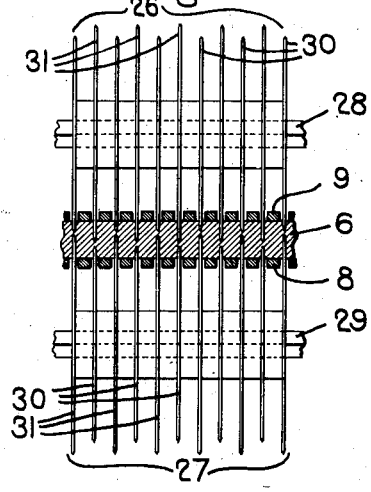
Fig. 6 is a section on the line 6—6, Fig. 5.

In Figs. 5 and 6 I have shown a different embodiment of the invention wherein both shallow and deep slits are made in each face of the slice of meat, the shallow slits in one face being opposed to a deep slit in the other face, and the opposed slits being separated by a thin uncut film of meat. In the construction shown in Figs. 5 and 6 there are two gangs of rotary knives indicated generally at 26 and 27, these knives being mounted upon shafts 28, 29 which are suitably journalled in the frame and which may be rotated by the mechanism illustrated in Figs. 1 and 2. Each group of knives contains knives of a plurality of different sizes. For instance, the group or gang 26 contains some knives 30 of smaller diameter and other knives 31 of larger diameter. As shown these knives of two different diameters are arranged alternately so that there will be a knife 30 of smaller diameter between each two adjacent knives 31 of larger diameter.

The knives of the group 27 are also made up of knives 31 of larger diameter and 30 of smaller diameter, the larger and smaller knives 31 and 30 alternating so that there will be a small knife 30 between each two adjacent large knives 31 and conversely a large knife 31 between each two adjacent smaller knives 30.

These two sets of knives are so arranged that there will be a large knife 31 of the gang 27 opposite each smaller knife 30 of the gang 26 and a small knife in the gang 27 opposite each larger knife in the gang 26. This is clearly shown in Fig. 6.

The device shown in Fig. 6 has meat-feeding means similar to that shown in Figs. 1 and 2 for feeding the meat 6 past the knives. Said meat-feeding means are shown in a fragmentary way at 8 and 9. When the slice of meat 6 is fed between the knives there will be formed in the upper surface thereof a series of deeper slits 32 formed by the knives 31 of the gang 26 and a series of shallower slits 33 formed by the knives 30 of said gang. There will also be formed in the under side of the slice 6 a series of deeper slits 34 formed by the larger knives 31 of the gang 27 and a series of shallower slits 35 formed by the smaller knives 30 of said gang 27.

The knives are so positioned that a slight space extends between the periphery of each knife in either gang and the periphery of the opposed knife in the other gang so that there will be a thin film or uncut portion 36 of meat between each pair of opposed slits.

Figure 7:
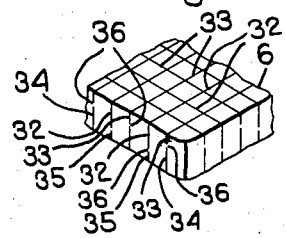
Fig. 7 is a fragmentary perspective view of a portion of a steak or slice of meat which has been slit on the machine shown in Figs. 5 and 6.

Because of the arrangement of knives these thin uncut portions 36 between opposed slits will have a staggered relation as indicated best in Fig. 7. An advantage of this arrangement is that if the slice of meat contains any vein which is of a tough or gristly nature such vein will be sure to be cut by some of the slits.

It is intended that after the meat has been passed through the slitting machine once to form a series of parallel slits in both sides of the meat, said slice of meat will be passed through the machine a second time to give it a second series of slits which cross those made when the meat was passed through the machine the first time, thereby giving the meat the slit appearance shown in Fig. 7.

I claim.

1. A meat-slitting machine comprising two sets of rotary slitting knives, and means to feed a slice of meat between said sets of knives, each set of knives presenting knives of different diameters, whereby slits of different depths will be cut in each face of said slice of meat.

2. A meat-slitting machine having two gangs of rotary slitting knives and means to feed the slice of meat between said gangs of knives, each gang of knives comprising knives of two different diameters, the knives of smaller diameter of each gang being situated opposite to but spaced from the knives of larger diameter of the other gang.

3. A machine for slitting meat comprising two meat-feeding members between which the meat is fed, each member having an arcuate meat-feeding face to engage the meat, means to move the faces forward thereby to move the meat forward, and means to cut in each face of the meat as it is fed forward a series of slits extending partially through the meat and in the direction of feed.

4. A machine for slitting meat comprising two meat-feeding members between which the meat is fed, each member having an arcuate meat-feeding face to engage the meat, means to move the faces forward thereby to move the meat forward, and means to cut in each face of the meat as it is fed forward a series of slits extending partially through the meat and in the direction of feed, and with the slits in one face overlapping those in the other face.

5. A machine for slitting meat comprising two meat-feeding members between which the meat is fed, each member having a rigid curved meat-feeding face, means to move the faces forward thereby to feed the meat forward, two sets of rotary knives, one acting on each face of the meat as it is fed forward and cutting therein slits extending in the direction of feed.

6. A machine for slitting meat comprising two meat-feeding members between which the meat is fed, each member having a rigid curved meat-feeding face, means to move the faces forward thereby to feed the meat forward, two sets of rotary knives, one acting on each face of the meat as it is fed forward, and means to rotate the knives with a surface speed greater than that of the meat-feeding members, whereby the knives cut slits in the meat in the direction of feed.

7. A meat-slitting machine comprising two meat-feeding members, one above the other between which the meat is fed, each member having an arcuate meat-feeding face and a plurality of knife-receiving slots, means to move the meat-feeding faces forward thereby to feed the meat forward, and a set of knives extending through the slots of each meat-feeding member and operating to cut slits in the meat which extend partially but not entirely therethrough as the meat is fed forward.

8. A meat-slitting machine comprising two meat-feeding members, one above the other between which the meat is fed, each member having an arcuate meat-feeding face and a plurality of knife-receiving slots, a set of rotary knives for each meat-feeding member, each set of knives being rotatable about a fixed axis and operating through the slots of the corresponding meat-feeding member, and means to rotate the knives.

9. A meat-slitting machine comprising two meat-feeding members, one above the other between which the meat is fed, each member having an arcuate meat-feeding face and a plurality of knife-receiving slots, a set of rotary knives for each meat-feeding member, each set of knives being rotatable about a fixed axis and operating through the slots of the corresponding meat-feeding member, and means to rotate the knives with a greater surface speed than that of the meat-feeding members.

10. A machine for slitting meat comprising means to feed a slice of meat forward, and means to cut in each side of said piece of meat as it is fed forward a series of parallel slits extending in the direction of the feeding movement, each slit on one side of the meat being located between two adjacent slits on the opposite side, and some at least of the slits on each side having a depth sufficient so that they overlap slits formed on the other side.

JOSEPH P. SPANG.